Feb. 2, 1943.   J. B. GIERN ET AL   2,310,025
UNIVERSAL VISE
Filed May 1, 1941
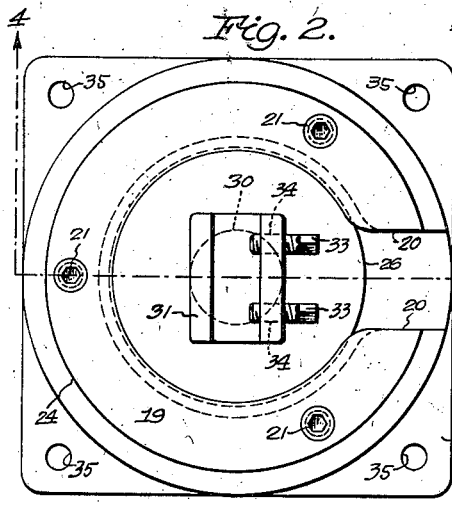
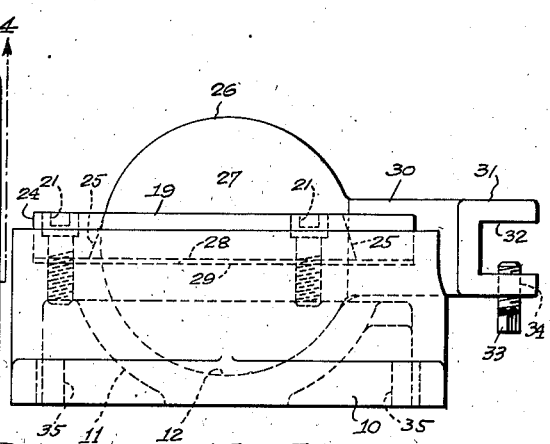
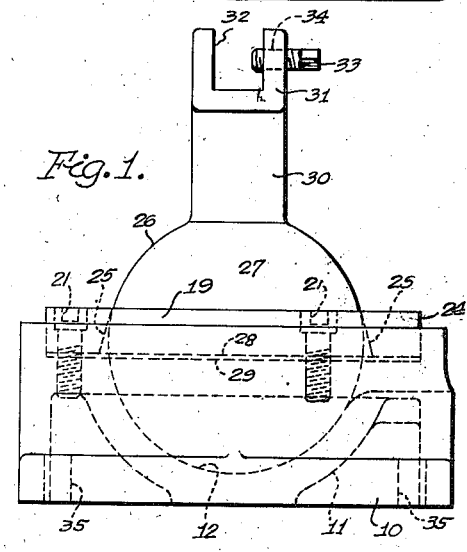
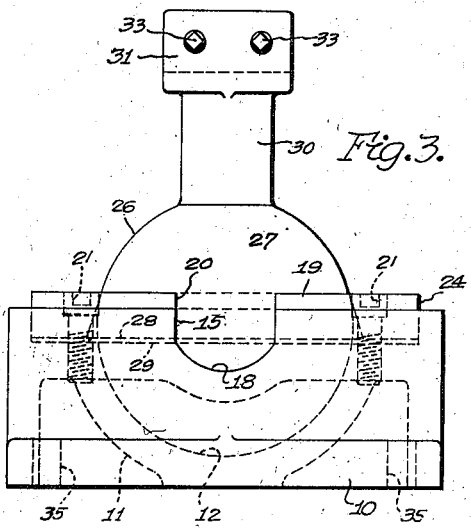
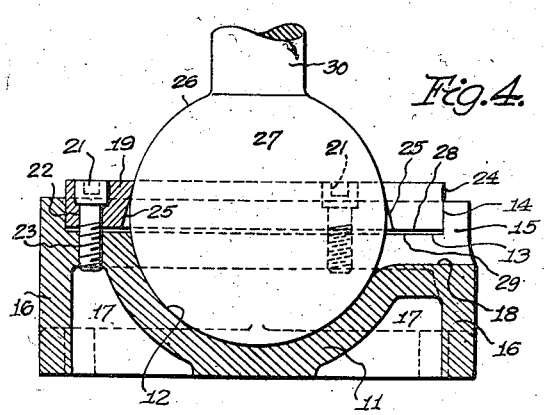
Inventors
James B. Giern
Anders P. Apholt
Barthel & Bugbee
Attorneys

UNITED STATES PATENT OFFICE 2,310,025

UNIVERSAL VISE

James B. Giern and Anders P. Anholtt, Detroit, Mich.

Application May 1, 1941, Serial No. 391,264

4 Claims. (Cl. 287—12)

This invention relates to work holders and in particular to vises for holding work pieces in various positions, preferably in connection with machine tools.

One object of this invention is to provide a universal vise wherein the work holder is movable into various positions ranging from vertical to horizontal, and is capable of being rigidly clamped in the adjusted position.

Another object is to provide a universal vise wherein the work holder is mounted on a ball which is clamped into a spherical recess or socket by a ring secured in an annular recess which prevents outward expansion of the ring as it is clamped down against the ball.

Another object is to provide the universal vise as set forth in the preceding object wherein the clamping ring is provided with a radial slot making it C-shaped so as to enable the stem of the work holder to be swung from a vertical to a completely horizontal position, the annular recess in which this C-shaped ring is seated serving to prevent the outward expansion of the C-shaped ring as it is clamped into position against the ball, the base having a corresponding slot aligned with the slot in the C-shaped ring.

In the drawing:

Figure 1 is a side elevation of a preferred form of a universal vise according to the present invention.

Figure 2 is a top plan view of the universal vise shown in Figure 1.

Figures 3 is a front elevation of the universal vise shown in Figures 1 and 2.

Figure 4 is a fragmentary central vertical section taken along the line 4—4 in Figure 2.

Figure 5 is a side elevation similar to Figure 1 but with the work holder swung from a vertical to a completely horizontal position.

In general, the universal vise of this invention consists of a base having a spherical socket surrounded by an annular recess. Seated in the socket is a ball having a stem surmounted by a work holder. The ball is clamped into the socket by means of a C-shaped ring seated in the annular recess. When the C-shaped ring is tightened by its clamping screws, it is prevented from expanding outwardly by the walls of the annular recess, so that it securely clamps the ball in the socket. The slot in the C-shaped clamping ring cooperates with a slot in the base to permit the stem of the work holder to be swung from a vertical to a completely horizontal position by moving it downwardly into the slots.

Referring to the drawing in detail, Figures 1 and 4 show the universal vise of this invention as consisting of a base 10 having the central portion 11 containing a spherical socket 12 surrounded by an annular recess 13 having an annular side wall 14 and a slot 15 therein (Figure 3). The base 10 may be solid or it may have the central portion 11 separated from the hinge portion 16 by an annular hollow space 17. The recess 15 is preferably extended downwardly as at 18 slightly below the level of the annular recess 13.

Mounted in the recess 13 and engaging the outer wall 14 thereof is a C-shaped clamping ring 19 having a radial slot 20 entirely through the ring aligned with the slot 15 in the base 10. The clamping ring 19 is held in clamping position by set screws 21 passing through holes 22 in the clamping ring 19 and threaded into holes 23 in the base 10. The outer surface 24 of the clamping ring 19 preferably corresponds to the outer wall 14 of the recess, whereas the inner surface 25 of the clamping ring 19 is preferably conical or curved.

Seated in the spherical socket 12 is a ball 26 having spherical outer surface 27 which is engaged by the flared inner surface 25 of the clamping ring 19. The relative dimensions of the parts are such that when the clamping ring 19 is clamped against the ball 26 by tightening the clamping screws 21, the bottom surface 28 of the C-shaped clamping ring 19 is spaced slightly above the bottom surface 29 of the recess 13, thereby providing a slight clearance between the opposing surfaces 28 and 29. Rising from the ball 26 is a stem 30 surmounted by a work holder 31 of any suitable form. The work holder shown in the drawing is a form adapted to hold the objects ordinarily worked upon and consists of a transverse portion 31 provided with a groove 32 for receiving the work piece. The latter is secured in the groove by tightening the set screws 33 threaded through the threaded holes 34 in the work holder 31.

The universal vise of this invention may be used by itself or it may be clamped to the bed of a machine or work bench by any suitable means, such as by clamping bolts or magnets. For this purpose, the base 10 may be provided with holes 35 for the reception of clamping bolts. When the universal vise is employed in a machine tool such as a milling machine, shaper or grinder, the clamping bolts are inserted in T slots in the bed of a machine and thereby the vise is firmly held against the base.

In the operation of the invention, the work piece is inserted in the slot 32 and secured firmly in position by tightening the set screws 33, either with or without an intermediate strip of soft metal, such as copper, to prevent marring or denting the work piece. The clamping screws 21 are then loosened and the work holder 31 swung into the desired position. One of these positions (Figure 5) occurs when the stem 30 is substantially horizontal, the stem 30 passing through the slots 20 and 15 in the clamping ring 19 and base 10 respectively. When the work holder 31 has been located in the desired position, it is clamped in that position by tightening the clamping screws 21. When this is done, the inner surface of the clamping ring 19 forces the spherical surface 27 of the ball 26 down into the spherical socket 12, and holds it tightly in position. If the stem 30 is horizontal (Figure 5), the C-shaped clamping ring 19 permits the stem to pass out between the arms of the clamping ring and through the corresponding slot 15 in the base 10. Since the C-shaped clamping ring 19 is disposed in an annular recess 13 with outer walls 14, the clamping ring 19 is prevented from expanding laterally as it is clamped in position. Thus the ball 26, stem 30 and work holder 31 are held in a rigid position without any yielding of the parts, even though the working conditions require a horizontal position of the stem 30 (Figure 5).

In this manner, there is provided a universal vise in which the stem 30 may be swung from a completely vertical to a completely horizontal position without interference on the part of the clamping ring 19 or the base 10. The slot 20 in the clamping ring 19 and the cooperating slot 15 in the base 20 prevents such interference and permits a wide range of adjustment to be accomplished.

While a specific embodiment of the invention has been described and illustrated, it will be understood that various modifications may be made provided they come within the scope of the claims.

What we claim is:

1. A device of the character described comprising a base having a socket and an internal annular recess surrounding said socket, a work holder having a spherical portion seated in said socket, a C-shaped clamping member having an internal beveled surface secured in said recess with said beveled surface engaging said spherical portion, and circumferentially spaced screws for clamping said clamping member to said base whereby said clamping member will expand into engagement with said recess.

2. A device of the character described comprising a base having a socket and an annular internal recess surrounding said socket, a work holder having a spherical portion seated in said socket, a C-shaped clamping member having a beveled internal surface secured in said recess with the beveled surface engaging said spherical portion, and circumferentially spaced clamping screws for clamping said member to said base, said base having a slot in the outer wall of said annular recess alined with the slot in said C-shaped clamping member whereby expansion of the clamping member will tightly lock said spherical portion in said socket.

3. A device of the character described comprising a base having a socket and an annular internal recess surrounding said socket, a work holder having a convex portion seated in said socket and having a stem adjacent said convex portion, a radially slotted clamping member having a beveled internal surface secured in said recess with the beveled surface engaging said convex portion, and means for clamping said clamping member to said base whereby expansion of the clamping member will lock the same in the recess, said base having a slot in the outer wall of said annular recess in alignment with the slot in said clamping member and cooperating therewith to receive said stem.

4. A device of the character described comprising a base having a spherically curved socket surrounded by an internal annular recess with a radial slot through the side wall thereof, a spherically curved body seated in said socket, a stem connected to said body, a work holder on said stem, a C-shaped clamping ring having a beveled internal surface secured in said recess with its slot in alignment with the slot in the annular recess, said slots having a width greater than the width of said stem whereby to receive said stem, and means for clamping said clamping ring to said base whereby expansion of said ring will lock the same in said recess.

JAMES B. GIERN.
ANDERS P. ANHOLTT.